United States Patent Office 3,290,262
Patented Dec. 6, 1966

3,290,262
METHODS OF PRODUCING RIGID CELLULAR MATERIALS AND PRODUCTS OBTAINED THEREBY
André Alexandre Leclercq, Trilport, France, assignor to Pneumatiques, Caoutchouc Manufacture & Plastiques Kleber Colombes, Colombes, France, a corporation of France
No Drawing. Filed Mar. 12, 1964, Ser. No. 351,513
Claims priority, application France, Feb. 2, 1960, 817,511, Patent 1,256,549
14 Claims. (Cl. 260—2.5)

The invention relates to a method of preparing rigid cellular materials having closed cells and containing polyvinyl chloride as a major constituent by weight, and to the materials thus obtained.

This application is a continuation-in-part of my application S.N. 85,972, filed January 31, 1961, now abandoned.

It is known to prepare such cellular materials by mixing together a preponderant amount of polyvinyl chloride, a polyisocyanate, a blowing agent and if desired other ingredients, for example fillers or pigments, filling a mould with this mixture and heating to a temperature at which the polyvinyl chloride is gelified and the blowing agent decomposes, i.e. generally to a temperature between 150 and 200° C., under a pressure large enough to balance the pressure of the gas released by the decomposition of the blowing agent, i.e. generally under a pressure of some hundreds of kilograms per square centimetre, then cooling the mould under pressure, releasing the pressure, opening the mould and removing the product, and subjecting the product to the action of hot water or steam.

Such materials are being increasingly used for purposes such as building and the construction of ships and aircraft because of their excellent mechanical properties, their lightness, and their good heat- and sound-insulating properties. However, their uses have so far been limited because the generally known forms of these materials soften when the temperatures rises. This is due to the thermoplastic character of polyvinyl chloride, which begins to soften above 70° C. In most cases, materials containing polyvinyl chloride as a major constituent cannot resist permanent temperatures of 70° C. or more.

It is accordingly an object of the present invention to provide a method of preparing rigid cellular materials having closed cells and containing polyvinyl chloride as a major constituent by weight, the materials thus obtained having improved resistance to deformation at temperatures above 70° C.

Other objects of the invention will be in part obvious and in part pointed out hereinafter.

By "polyvinyl chloride" is meant a homopolymer or copolymer of vinyl chloride containing at least 50 mole percent of vinyl chloride.

Surprisingly, the objects of the present invention are achieved by the incorporation of a bitumen having a softening point between 80° C. and 200° C. into the mixture from which the materials of the invention are prepared. In United States Patent No. 2,888,407 to Cooper et al., it is suggested that the ethenoid plastics, in particular polyvinyl chloride, should be used in the preparation of closed cell expanded materials consisting predominantly of bitumen to reduce the cold flow and improve the impact strength of these materials.

If the addition of polyvinyl chloride to bituminous cellular material thus improves its mechanical properties, one would deduce that the addition of bitumen to polyvinyl chloride cellular materials would cause a deterioration in their mechanical properties. Accordingly, the discovery that such an addition is not disadvantageous but actually improves thermal stability at temperatures above 70° C., is a surprising one. The present invention, as already stated, relates to materials containing polyvinyl chloride as a major constituent by weight.

The bitumen used in the present invention are solid or semi-solid natural or synthetic hydrocarbons which, as laid down in the bitumen test procedure of ASTM D4–52, are soluble in carbon disulfide. Their softening points, as determined by the ring and ball method of ASTM D36–26, are between 80° C. and 200° C. These bitumen substances include the so-called "blown bitumens" or "oxidised bitumens" obtained by blowing air through certain of the residues obtained in petroleum distillation; asphalts; ozokerite; gilsonite; and certain substances obtained by the destructive distillation of coal.

The presence of at least 1% by weight of bitumen, with respect to the weight of polyvinyl chloride, appears to be a practical minimum. If amounts of bitumen larger than 40% by weight with respect to the weight of polyvinyl chloride are used, the expansion of the cellular material, which occurs during the last step of the process when hot water or steam is applied, is not correct, the expanded objects having an irregular shape. Thus, 40% by weight of bitumen appears to be a practical maximum. The amount of polyvinyl chloride, which is present as a major constituent by weight of the starting mixture, ranges from 2.5 to 100 times the weight of bitumen.

In the term "polyisocyanate" are included aliphatic di-isocyanates such as ethylene di-isocyanate, trimethylene di-isocyanate, tetramethylene di-isocyanate, hexamethylene di-isocyanate and decamethylene di-isocyanate, aromatic di-isocyanates such as p-phenylene di-isocyanate, m-phenylene di-isocyanate, 2,4-toluene di-isocyanate, 2,6-toluene di-isocyanate, 4,4'-diphenylmethane di-isocyanate, 3,3'-diphenyl di-isocyanate, 3,3'-dimethoxy-4,4'-diphenyl di-isocyanate, p,p'-diphenylmethane di-isocyanate, dichlorodiphenylmethane di-isocyanate, diphenyldimethylmethane di-isocyanate, dibenzyl di-isocyanate and diphenyl ether di-isocyanate; tri-isocyanates such as 2,4,6-toluene tri-isocyanate, 2,4,6-ethylbenzene tri-isocyanate, 2,4,6-monochlorobenzene tri-isocyanate, 4,4',4''-triphenylmethane tri-isocyanate, and 2,4,4'-diphenyl tri-isocyanate; tetra-isocyanates such as p,p',o,o'-diphenylmethane tetra-isocyanate; and higher polyisocyanates such as polymethylene poly-phenyl-isocyanate.

Aromatic di-isocyanates are particularly preferred for use in the method of the invention, especially the toluene di-isocyanates and the diphenylmethane di-isocyanates.

The term "heat-decomposable blowing agent" means a chemical compound capable of irreversibly releasing nitrogen when heated to a temperature between 80° C. and 250° C., either under elevated pressure or normal atmospheric pressure. Suitable compounds include azo-compounds such azobisformamide, di-isoazobutyronitrile, and diazoaminobenzene; N-nitroso-compounds such as N,N' - dimethyl - N,N' - dinitroso-terephthalamide and N,N'-dinitroso-pentamethylenetetramine; and sulfonyl hydrazides such as benzenesulfonyl hydrazide, benzene-1,3-disulfonyl hydrazide, diphenylsulfonyl-3,3'-disulfonyl hydrazide and 4,4'-oxybis (benzenesulfonyl hydrazide).

In order to point out more fully the nature of the present invention, the following examples are given to illustrate its scope but are not to be construed as a limitation thereon.

EXAMPLE 1

44 parts by weight of polyvinyl chloride were mixed in a Werner mixer with 12 parts by weight of the hard oxidized asphalt sold by Esso Standard Oil Co., under the named Hard Asphalt 155/0. This latter substance is a bituminous substance obtained by blowing air into certain of the residues obtained in petroleum distillation, and is characterized by a solubility of greater than 99.5% in carbon disulfide, a softening point between 150° and 158° C. using the ring and ball method of ASTM D36–26, a Cleveland open cup flash point higher than 320° C., and a density greater than 1.05 gm./cc. at 25° C. The expression "155/0" is a grade mark indicating that the softening point is 155° C. and that there is zero penetration into the material of a point under a load of 100 gm. for 5 seconds at 25° C., i.e. under the conditions of ASTM D5–61.

To this mixture were added 26 parts by weight of 2,4-toluene di-isocyanate and 9.2 parts by weight of di-isoazobutyronitrile. Mixing was continued until all the constituents were homogeneously mixed.

The paste thus obtained was poured into a mould so as to fill it and heated under an external pressure of 250 kg./cm.$^2$ for twenty minutes at a temperature of 175° C. After cooling, the external pressure was decreased, the mould was opened and the material thus formed was removed and then placed in a warm chamber in contact with water vapour at 95° C. Under these conditions both a second expansion and a hardening of the cellular material obtained by moulding were simultaneously produced. The material obtained had a density of 40 kg./m.$^3$ and withstood a temperature of 75° C. for 1,000 hours without deformation. At this temperature its resistance to compression was still 1.8 kg./cm.$^2$.

A portion of the material obtained was treated with carbon disulfide. Only 20% by weight of the initial amount of hard oxidized asphalt was found to be extracted, i.e. 2.5% of the cellular product, even though the dispersion of the asphalt favours such extraction. In contrast, one extracting an expanded material containing polyvinyl chloride but consisting predominantly of bitumen, it was found that the bitumen was quantitatively extracted by carbon disulfide.

The comparison of cellular materials is made somewhat difficult by the fact that if one component of the reaction mixture is varied or omitted, the manufacturing conditions frequently have to be varied. This should be borne in mind when the foregoing and subsequent comparisons are considered.

In the mixture of Example 1, the 12 parts by weight of hard oxidized asphalt were replaced by 7.5 parts by weight of an oil based on aromatic hydrocarbons, having a viscosity of 40° Engler at 50° C. and sold under the trade name Dutrex V10 by Shell Saint Gobain. By following the procedure of Example 1, a cellular material having the same density was obtained. This material was buckled after only 24 hours at 75° C., and its resistance to compression at this temperature was 1.4 kg./cm.$^2$.

In the mixture of Example 1, the particular hard oxidized asphalt used has been replaced by other bituminous substances also obtained by blowing air into certain of the residues obtained in petroleum distillation, but having different softening points and penetration values as determined respectively by ASTM D36–26 and ATSM D5–61. Rigid cellular materials having good thermal stability were obtained, but with the softer bituminous substances it is rather more difficult to mix the ingredients thoroughly into a paste.

EXAMPLE 2

In the mixture of Example 1, the 12 parts by weight of hard oxidized asphalt were replaced by 12 parts by weight of ozokerite. By following the procedure of Example 1, a cellular material having a resistance to compression of 1.6 kg./cm.$^2$ at 75° C. was obtained. The material did not collapse after 1000 hours at 75° C.

EXAMPLE 3

The procedure of Example 1 was applied to the following mixture:

| | Parts by weight |
|---|---|
| Polyvinyl chloride | 100 |
| Hard Asphalt 155/0 | 27.8 |
| Phthalic anhydride | 43.5 |
| 2,4-toluene di-isocyanate | 43.3 |
| Azodicarbonamide (blowing agent) | 0.42 |

The cellular material thus obtained had a density of 67 kg./m.$^3$, and withstood a temperature of 75° C. for 1000 hours without deformation. Attempts to obtain a cellular material having the same density and the same stability at 75° C., using the same ingredients in the starting mixture with without the Hard Asphalt 155/0, i.e. without the bituminous substance, were unsuccessful. This bituminous substance was, of course, the same as that used in Example 1.

EXAMPLE 4

The procedure of Example 1 was applied to the following mixture:

| | Parts by weight |
|---|---|
| Polyvinyl chloride | 100 |
| Hard Asphalt 155/0 | 5.8 |
| Phthalic anhydride | 40.5 |
| Diphenylmethane di-isocyanate | 62.6 |
| Di-isoazobutyronitrile | 1.9 |
| Azodicarbonamide | 0.2 |
| Magnesium oxide | 2.7 |

The cellular material thus obtained had a density of 51 kg./m.$^3$ and withstood a temperature of 75° C. for 1000 hours without deformation. Attempts to obtain a cellular material having the same density and the same stability at 75° C., using the same ingredients in the starting mixture but without the Hard Asphalt 155/0, were unsuccessful.

While the objects of the invention are achieved if the starting mixture contains a major amount by weight of polyvinyl chloride, a heat-decomposable blowing agent as hereinbefore defined, a polyisocyanate and a bituminous substance having a softening point between 80° C. and 200° C. as hereinbefore defined, it will be understood that other ingredients may be present, for example fillers, pigments, plasticizers and anhydrides.

I claim:

1. A method of preparing rigid cellular materials having closed cells and containing polyvinyl chloride as a major constituent by weight, which consists in the successive steps of mixing in a homogeneous manner polyvinyl chloride, a heat-decomposable blowing agent, a polyisocyanate and a bitumen consisting of a solid or semi-solid natural or synthetic hydrocarbon, soluble in carbon disulfide and having a softening point between 80° C. and 200° C., the amount of the polyvinyl chloride being from 2.5 to 100 times the weight of bitumen, heating the mixture under pressure in a mould to decompose the blowing agent and to gell the polyvinyl chloride, cooling the expanded material under pressure and removing it from the mould, and placing the expanded material in contact with hot water or water vapour to effect further expansion of the material.

2. A method according to claim 1, wherein the hot water or water vapour is at a temperature of from 95° to 100° C.

3. A method according to claim 1, wherein the heat-decomposable blowing agent is di-isoazobutyronitrile.

4. A method according to claim 1, wherein the polyisocyanate is an aromatic di-isocyanate.

5. A method according to claim 1, wherein the polyisocyanate is a toluene di-isocyanate.

6. A method according to claim 1, wherein the polyisocyanate is a diphenylmethane di-isocyanate.

7. A method of preparing rigid cellular materials having closed cells and containing polyvinyl chloride as a major constituent by weight, which consists in the successive steps of mixing in a homogeneous manner polyvinyl chloride, di-isoazobutyronitrile, an aromatic di-isocyanate and a bitumen consisting of a solid or semi-solid natural or synthetic hydrocarbon, soluble in carbon disulfide and having a softening point between 80° C. and 200° C., heating the mixture under pressure in a mould to decompose the blowing agent and to gell the polyvinyl chloride, cooling the expanded material under pressure and removing it from the mould, and placing the expanded material in contact with hot water or water vapor to effect further expansion of the material.

8. A method according to claim 7, wherein the hot water or water vapor is at a temperature of from 95° to 100° C.

9. A method according to claim 7, wherein the aromatic di-isocyanate is a toluene di-isocyanate.

10. A method according to claim 7, wherein the aromatic di-isocyanate is a diphenylmethane di-isocyanate.

11. A rigid celluuar material having closed cells and containing polyvinyl chloride as a major constituent by weight, said material also containing bitumen consisting of a solid or semi-solid natural or synthetic hydrocarbon, soluble in carbon disulfide and having a softening point between 80° C. and 200° C. the amount of polyvinyl chloride being from 2.5 to 100 times the weight of bitumen.

12. A method according to claim 1 wherein the bitumen is selected from the group consisting of "blown" or "oxidised" bitumens, asphalts, ozokerite, gilsonite and coal destructive-distillation products, and the heat decomposable blowing agent releases irreversibly nitrogen when heated to a temperature between 80° C. and 250° C.

13. A method according to claim 1 wherein the bitumen is a hard asphalt.

14. A method according to claim 12 wherein the bitumen is ozokerite.

References Cited by the Examiner

UNITED STATES PATENTS

| | | | |
|---|---|---|---|
| 2,576,749 | 11/1951 | Carpentier | 260—2.5 |
| 2,714,584 | 8/1955 | Kuster | 260—28.5 |
| 2,888,407 | 5/1959 | Cooper et al. | 260—2.5 |

FOREIGN PATENTS

| | | |
|---|---|---|
| 660,358 | 11/1951 | Great Britain. |
| 672,136 | 5/1952 | Great Britain. |
| 805,167 | 12/1958 | Great Britain. |

MURRAY TILLMAN, *Primary Examiner.*

SAMUEL H. BLECH, M. FOELAK,
*Assistant Examiners.*